United States Patent
Lu et al.

(10) Patent No.: US 9,379,914 B2
(45) Date of Patent: Jun. 28, 2016

(54) METHOD AND SYSTEM FOR IMPLEMENTING AGGREGATE ENDPOINTS ON IMS NETWORKS

(75) Inventors: Min Lu, Freehold, NJ (US); Martin Dolly, Forked River, NJ (US); Saul Fishman, Highland Park, NJ (US); Gerald Hoover, Red Bank, NJ (US); Mark Ratcliffe, Oakhurst, NJ (US); Tienyu Chiu, Naperville, IL (US); Guy J. Zenner, Northbrook, IL (US); Canby Dautel, Jr., Framingham, MA (US); Hadriel Kaplan, Amherst, NH (US); Nathan Thomas Denbow, Sandwich, MA (US)

(73) Assignees: AT&T INTELLECTUAL PROPERTY I, L.P., Atlanta, GA (US); ACME PACKET, INC., Bedford, MA (US)

( * ) Notice: Subject to any disclaimer, the term of this patent is extended or adjusted under 35 U.S.C. 154(b) by 1533 days.

(21) Appl. No.: 11/803,126

(22) Filed: May 11, 2007

(65) Prior Publication Data

US 2012/0219127 A1    Aug. 30, 2012

(51) Int. Cl.
*H04L 12/66* (2006.01)
*H04W 4/00* (2009.01)
*H04L 29/06* (2006.01)

(52) U.S. Cl.
CPC ............ *H04L 12/66* (2013.01); *H04L 65/1016* (2013.01); *H04L 65/1073* (2013.01)

(58) Field of Classification Search
CPC ............ H04L 65/1016; H04L 65/1073; H04L 65/1046; H04W 60/00
USPC ................................ 370/401; 455/435.1, 433
See application file for complete search history.

(56) References Cited

U.S. PATENT DOCUMENTS

| | | | |
|---|---|---|---|
| 4,805,209 | A | 2/1989 | Baker, Jr. et al. |
| 4,942,602 | A | 7/1990 | Baker, Jr. et al. |
| 5,960,200 | A | 9/1999 | Eager et al. |
| 6,018,570 | A | 1/2000 | Matison |
| 6,535,489 | B1 | 3/2003 | Merchant et al. |
| 6,748,530 | B1* | 6/2004 | Aoki ....................... G06F 21/33 713/156 |
| 6,801,604 | B2 | 10/2004 | Maes et al. |
| 6,934,756 | B2 | 8/2005 | Maes |
| 7,031,747 | B2 | 4/2006 | Cyr et al. |
| 2002/0077908 | A1* | 6/2002 | Sakuma et al. .................. 705/14 |
| 2003/0186681 | A1* | 10/2003 | Gabor ........................... 455/411 |
| 2005/0124341 | A1* | 6/2005 | Myllymaki ........... H04W 60/00 455/435.1 |

(Continued)

OTHER PUBLICATIONS

"IMS Wireline Enterprise Services", AcmePacket webpage pp. 1-3 (Apr. 23, 2006).*

(Continued)

*Primary Examiner* — Asad Nawaz
*Assistant Examiner* — Jason Harley
(74) *Attorney, Agent, or Firm* — Hoffman & Baron, LLP

(57) ABSTRACT

A method and system are adapted to provide telephony services to aggregate endpoints on an Internet Protocol Multimedia Subsystem (IMS) network. The method includes assigning one or multiple PUIDs for surrogate registration purposes during the provisioning of the aggregate endpoint, performing reliable surrogate registration on behalf of the aggregate endpoint, allowing multiple SBCs to perform surrogate registrations independently for the same aggregate endpoint to achieve reliability, and providing reliable connection from an IMS core to the aggregate endpoints via multiple S/BCs. The system includes one or more Session Border Controllers (S/BC), at least one set of Call/Session Control Functions (CSCF), and an HSS operatively coupled together.

14 Claims, 5 Drawing Sheets

(56) References Cited

U.S. PATENT DOCUMENTS

| | | | |
|---|---|---|---|
| 2006/0046714 A1* | 3/2006 | Kalavade | 455/428 |
| 2007/0072605 A1* | 3/2007 | Poczo | 455/432.2 |
| 2007/0153777 A1* | 7/2007 | Coulas et al. | 370/356 |
| 2007/0206580 A1 | 9/2007 | Silver et al. | |
| 2007/0230374 A1* | 10/2007 | Altberg et al. | 370/271 |
| 2007/0238468 A1* | 10/2007 | Buckley et al. | 455/445 |
| 2008/0101552 A1* | 5/2008 | Khan et al. | 379/45 |
| 2008/0194258 A1* | 8/2008 | Chiu et al. | 455/435.1 |

OTHER PUBLICATIONS

Gurbani et al, "Representing Trunk Groups in Tel/SIP Uniform Resource Identifiers (URIs) Draft-ietf-iptel-Trunk-Group-10.txt", Bell Laboratories, Alcatel-Lucent (Jan. 17, 2007).

"IMS Wireline Enterprise Services", AcmePacket, webpage pp. 1-3 (Apr. 23, 2006).

$3^{rd}$ Generation Partnership Project; Technical Specification Group Services and Systems Aspects; Evolution of the GSM Platform Towards UMTS (3G TR 23.920 Version 2.0.0), 3GPP Organization Partners, pp. 1-53 (Jun. 1999).

$3^{rd}$ Generation Partnership Project; Technical Specification Group Services and Systems Aspects; Evolution of the GSM and Mobile IP Mobility Handling in UMTS IP CN (3G TR 23.923 Version 2.0.0), 3GPP Organization Partners, pp. 1-79 (Dec. 1999).

"Combined GSM and MobileIP Mobility Handling in UMTS IP CN UMTS YY.XX Version 0.5.0", European Telecommunications Standards Institute (Feb. 12, 1999).

\* cited by examiner

METHOD AND SYSTEM FOR IMPLEMENTING AGGREGATE ENDPOINTS ON IMS NETWORKS

STATEMENT OF JOINT DEVELOPMENT AGREEMENT

The present invention was made under the auspices of joint development agreement to which AT&T Corporation, Alcatel-Lucent Corporation, and Acme Packet Corporation, are parties.

BACKGROUND OF THE INVENTION

1. Field of the Invention

The present invention generally relates to providing Internet Protocol (IP) telephony services to a collection of users behind aggregate endpoints that connect to a network, such as business customer sites or wholesale customer sites. Examples of IP telephony services include the EP Multimedia Subsystem (IMS), as well as other services in which user endpoints are required to register to the network in order to receive reliable service.

2. Brief Description of the Related Art

In the Internet Protocol (IP) Multimedia Subsystem (IMS) standard, which was originally designed for the individual subscriber wireless networks and is incorporated herein by reference, all subscribers need to register first before they can obtain services from the IMS network. As defined in the $3^{rd}$ Generation Partnership Program (3GPP) IMS standard for, IMS network service providers use a Public User Identity (PUID) as the identifier to recognize the subscriber. The PUID is included in a P-Asserted-Identity (PAI) header in Session Initiation Protocol (SIP) INVITE messages for outbound calls, Request-URI header in SIP Invite messages for inbound calls, and the To header in SIP registration messages.

As service providers increasingly offer services to aggregate or collections of users or subscribers, such as business and wholesale customers, using the same IMS network that provides reliable services to individual subscribers, the following key issues arise:

1. Customer Premise Equipment (CPE) devices for business or wholesale customer equipment do not register with the (IMS) network. Examples of some endpoints that cannot register are:
   (a) legacy Time Division Multiplexing (TDM) Public Branch Exchanges (PBXs) that access an IP network through a Voice-Over-IP (VoIP) gateway;
   (b) an IP device at customer premises that can not perform registration, such as IP PBX, or CPE running teleconferencing application; and in some cases, the PBX is a stateful proxy serving local IP phones, it usually is also their Registrar and thus will not forward the phone Registers on to the Core; and
   (c) wholesale equipment access to the IMS network via routers.
2. Business or wholesale services are applied to the connection or group instead of the individual subscriber. For example, based on a wholesale access point connection to the service provider, the wholesale service needs to be invoked as the originating service treatment for call screening, blocking, and routing.

SUMMARY OF THE INVENTION

A method of providing telephony services to aggregate endpoints on an Internet Protocol Multimedia Subsystem (IMS) network in accordance with one form of the present invention, which incorporates some of the preferred features, includes assigning a Public User Identity (PUID) to an aggregate endpoint by one or more Session Border Controllers for surrogate registration purposes, and performing reliable surrogate registration on behalf of the aggregate endpoint via one or multiple Session Border Controllers (S/BC). The aggregate endpoint may be a business customer site or a wholesale customer site.

The method also includes identifying an aggregate endpoint to be registered, and performing surrogate registration on behalf of the aggregate endpoint. The surrogate registration is not performed by the aggregate endpoint, and the surrogate registration is not performed by the plurality of user devices obtaining telephony services through the aggregate endpoint. The surrogate registration is preferably performed by at least one Session Border Controller (S/BC). Surrogate registration may be performed by a plurality of Session Border Controllers (S/BC) that may be adapted to independently perform surrogate registration on behalf of the aggregate endpoint. At least one of a Public User Identity (PUID) and a Private User Identity (PRID) associated with the aggregate endpoint may be stored in the Session Border Controller (S/BC), and the Private User Identity (PRID) may include a group identification (ID) associated with the aggregate endpoint.

A system adapted to provide telephony services to aggregate endpoint on an IMS network in accordance with one form of the present invention, which incorporates some of the preferred features, includes one or more Session Border Controller (S/BC) operatively coupled to the aggregate endpoint, at least one set of Call/Session Control Functions (CSCF) operatively coupled to the S/BC, and an HSS operatively coupled to the CSCFs. A PUID or multiple PUIDs for surrogate registration purpose can be assigned to the aggregate endpoint, and at least one of the S/BC, CSCF, and HSS identifies the aggregate endpoint during the provisioning of telephony services to the aggregate endpoint.

The surrogate registration is performed on behalf of the aggregate endpoint. The surrogate registration is not performed by the aggregate endpoint, and is not performed by the plurality of user devices obtaining telephony services through the aggregate endpoint. Surrogate registration is preferably performed by the at least one Session Border Controller (S/BC), and may be performed by a plurality of Session Border Controllers (S/BC) adapted to independently perform surrogate registration on behalf of the aggregate endpoint. The Session Border Controller (S/BC) may store at least one of a Public User Identity (PUID) and a Private User Identity (PRID) associated with the aggregate endpoint, and the Private User Identity (PRID) may include a group identification (ID) associated with the aggregate endpoint.

A computer-readable medium comprising instructions, wherein execution of the instructions by at least one processing device causes telephony services to be provided to aggregate endpoint on an IMS network by assigning the PUID to an aggregate endpoint associated with a plurality of users obtaining telephony services through the aggregate endpoint, and identifying the aggregate endpoint using the surrogate registered PUID during the provisioning of telephony services. The steps may include assigning a PUID to the aggregate endpoint, performing reliable surrogate registration on behalf of the aggregate endpoint, and allowing multiple SBCs to perform surrogate registration independently for the same aggregate endpoint to achieve reliability. The steps include identifying an aggregate endpoint to be registered, and performing surrogate registration on behalf of the aggregate endpoint. The surrogate registration is not performed by the aggregate endpoint, and is not performed by the plurality of user devices obtaining telephony services through the aggregate endpoint.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

Figure 1:
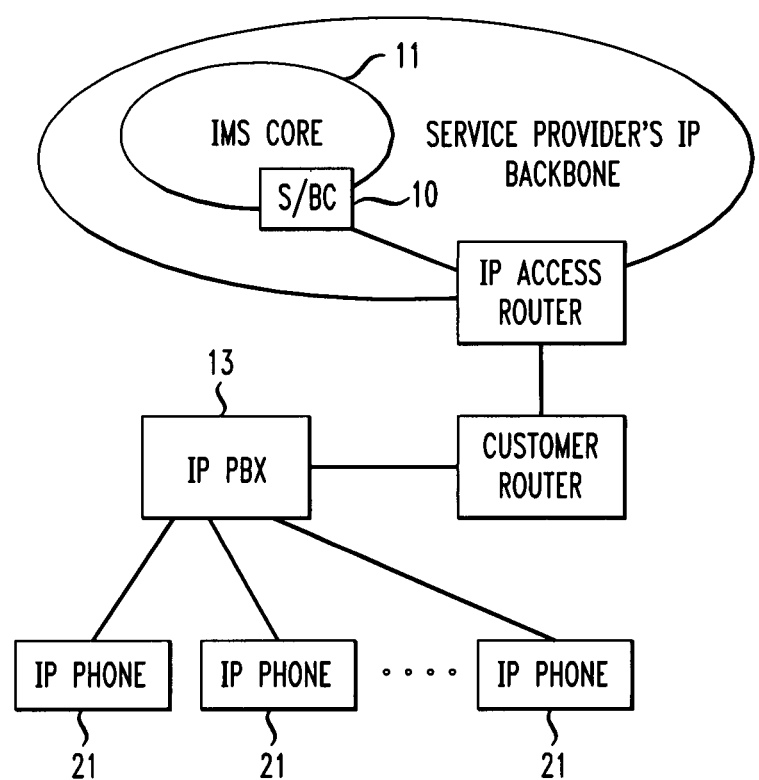
FIG. 1 is a block diagram that shows a business customer access.
Figure 2:
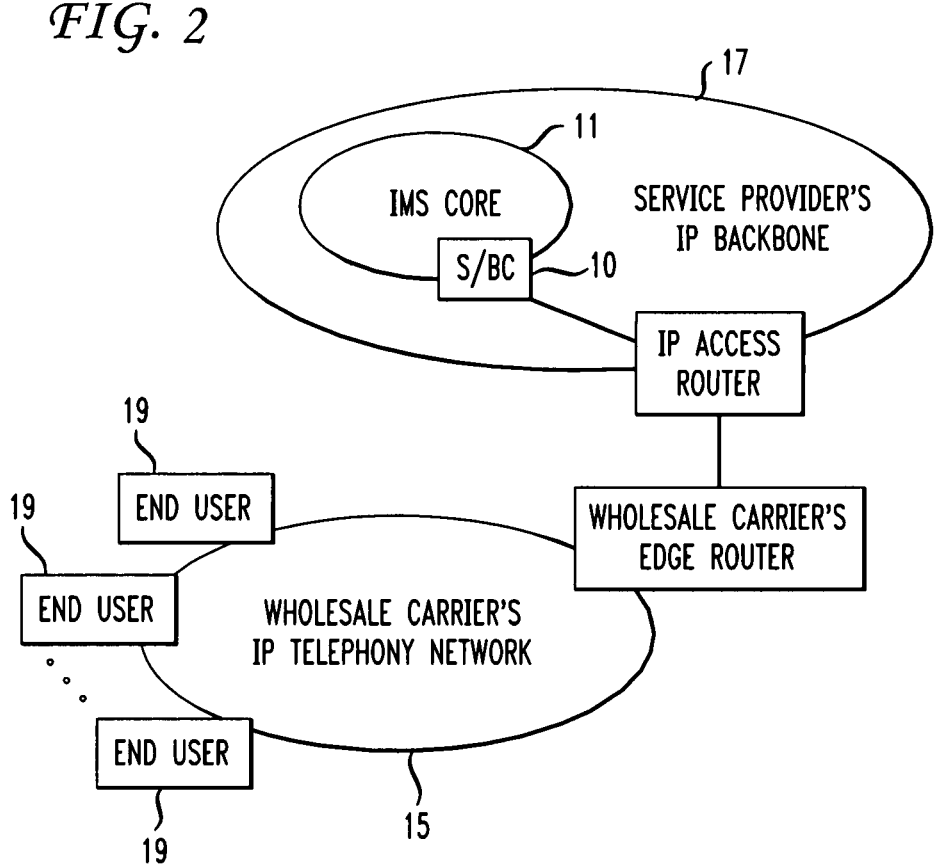
FIG. 2 is a block diagram that shows a wholesale customer access.

As shown in FIG. 1, business enterprise customers are customers that access the network, such as an IMS core 11 using a Private Branch Exchange (PBX) 13 or switch (TDM or softswitch). As shown in FIG. 2, wholesale customers are preferably a network 15 that resells services or access to the service provider 17. Thus, services are provided based on the access point for that network, and not typically on a per subscriber 19, 21 basis. For such customers, identification information regarding specific individual users obtaining services through the business or wholesale customer is not known, nor does it need to be known in accordance with the present invention. This type of access point is referred to herein as an "aggregate endpoint". The actual users 19, 21 behind the aggregate endpoint are connected to the network via one or more Session Border Controllers (S/BC) 10, but are not considered individual subscribers.

The present invention is directed to make one or more Session Border Controllers (S/BC) 10 performing surrogate registration on behalf of the aggregate endpoints. The S/BC 10 preferably uses a PUID recognized by the IMS network, to identify the originating aggregate endpoint, and to trigger the originating or terminating services.

Identification

Regarding the identification of a business customer or a wholesale customer, each business/wholesale customer location (access) is considered as an aggregate endpoint and allocated a private user identity, and a public user identity for surrogate registration purposes. The user device or phone associated with or behind the aggregate endpoint is preferably assigned the PUIDs that would be used for call originating and call terminating.

Provisioning

When a customer order comes in, a PUID for surrogate registration is preferably assigned to the aggregate endpoint. The PUID for surrogate registration will be provisioned in one or more S/BCs and a Home Subscriber Server (HSS).

After provisioning, the S/BC will contain Public User Identity (PUID) and Private User ID (PRID) information for the aggregate endpoint, which represents a collection of users. The PUID for surrogate registration is preferably a group ID, which is assigned to the aggregate endpoint for the purpose of surrogate registration. The HSS contains the user profile for the aggregate endpoint. There are also some other PUIDs which are the phones behind the aggregate endpoint that will be used to originate calls from or terminate calls to. Those PUIDs will be provisioned in the HSS as part of the implicit registration set along with the PUID for the surrogate registration.

Figure 3:
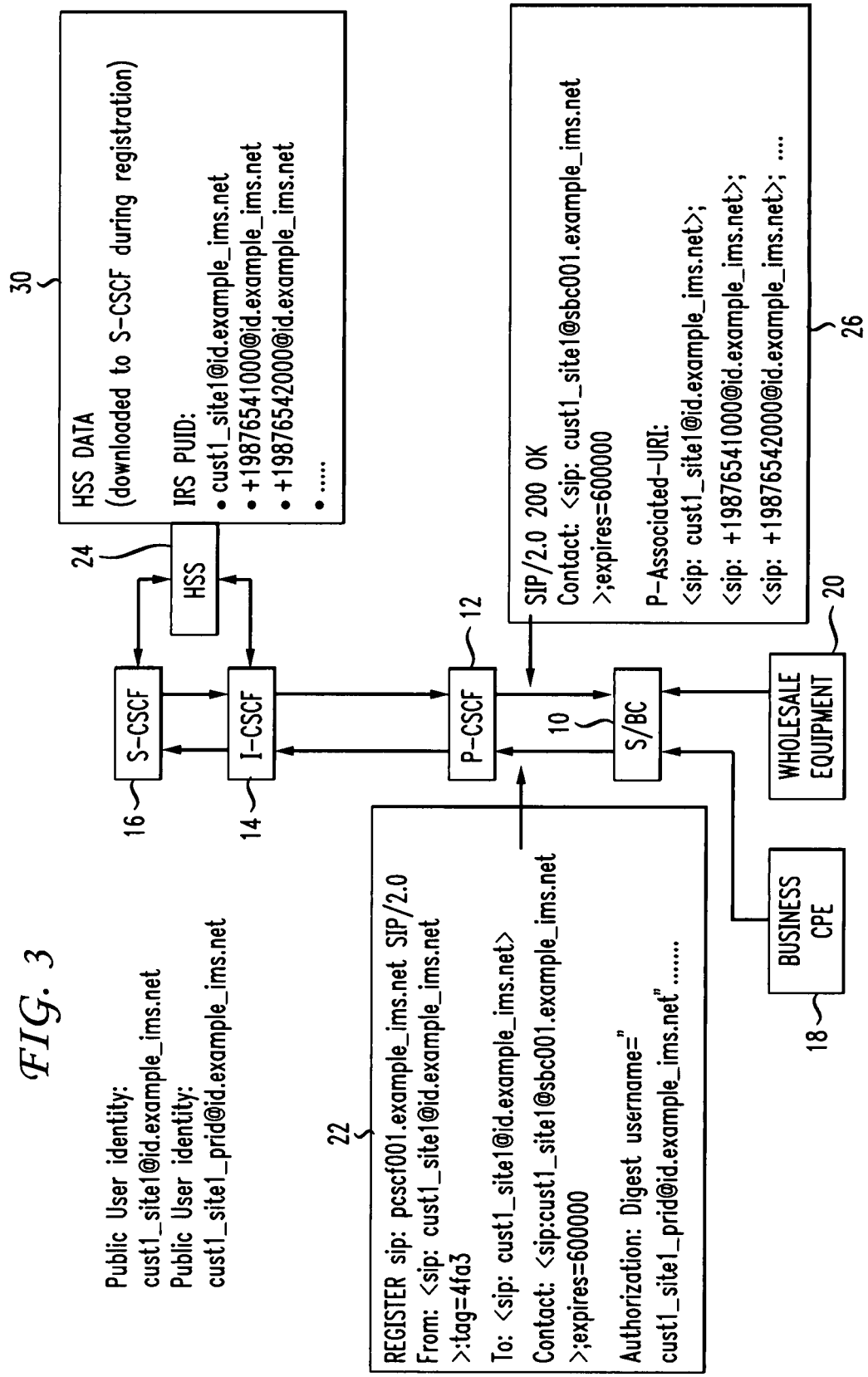
FIG. 3 is a block diagram showing surrogate registration of an aggregate endpoint, such as a business customer site or a wholesale customer site, in an Internet Protocol (IP) Multimedia Subsystem (IMS) network in accordance with the present invention.

An example of the provisioned data in the HSS and S/BC used in the example call flow shown in FIG. 3 is as follows:

"id.example_ims.net" is the home network domain name;

"cust1_site1_prid@id.example_ims.net" is the Private User Identity for an aggregate endpoint (a business/wholesale customer in one location);

"cust1_site1@id.example_ims.net" is the Public User Identity used for implicit registration of an aggregate endpoint (a business/wholesale customer in one location); and "+19876541000@ id.example_ims.net", . . . "sip:+19876542000@ id.example_ims.net" are the PUIDs in the implicit registration set that will be registered via the surrogate registration process.

Surrogate Registration of an Aggregate Endpoint

The IMS standard is defined with the concept that a user is registered to the IMS core so that the user can initiate and receive calls from the network. To allow an aggregate endpoint to interface with an IMS network, the aggregate endpoint must be registered with the network. Registration may rely on standard IMS registration procedures based on the private and public user identities representing the business/wholesale customer site as a whole.

FIG. 3 shows an example of the preferred registration call flow in accordance with the present invention. Blocks 10-16 represent functions implemented in software and/or hardware. When an aggregate endpoint connects to the IMS network for the first time, one or more Session Border Controllers (S/BC) 10, which function as a firewall or access point to the network, preferably perform surrogate registration on behalf of the business customer's Customer Premise Equipment (CPE) 18 or wholesale customer's equipment 20 since these customers are unable to perform this function.

In addition, HSS 24 contains the PRID and PUID for the aggregate endpoint and the service profile associated with the aggregate endpoint. This information is downloaded to the S-CSCF 16 for future call processing during the registration.

The detailed Registration call flow preferably proceeds as follows:

1. S/BC 10 sends Register message 22 to Proxy Call/Session Control Function (P-CSCF) 12. The Register message includes:

the aggregate endpoint's (in this case, business customer 18 or wholesale customer 20) Public User Identity (PUID) (cust1_site1@id.example_ims.net) in the SIP From header and To header;

the aggregate endpoint's Private User Identity (PRID) (cust1_site1_prid@id.example_ims.net) in the SIP Authorization header.

2. Upon receiving the SIP Register message from S/BC 10, P-CSCF 12 proxies the SIP Register message to Interrogating Call/Session Control Function (I-CSCF) 14.

3. I-CSCF 14 contacts Home Subscriber Server (HSS) 22 via the Diameter User-Authorization-Request (UAR) message to determine if there is a Serving Call/Session Control Function (S-CSCF) 16 already allocated to the PUID cust1_site1@id.example_ims.net.
4. HSS 22 responds with Diameter User-Authorization-Answer (UAA) message to I-CSCF 14 that provides the S-CSCF's capability information.
5. I-CSCF 14 performs the S-CSCF selection based on the capabilities received from HSS 22 and forwards the SIP Register message to S-CSCF 16
6. S-CSCF 16 sends a 401 Unauthorized message to I-CSCF 14.
7. I-CSCF 14 proxies the 401 Unauthorized message to P-CSCF 12.
8. P-CSCF 12 proxies the 401 Unauthorized message to S/BC 10.
9. S/BC 10 computes credentials for the registration and sends a new Register message with credentials to the P-CSCF 12. The difference between the new Register message and the Register message in Step 1 is that the credentials are included in the Authorization header.
10. P-CSCF 12 proxies a Register message with credentials to I-CSCF 14.
11. I-CSCF 14 sends the Diameter UAR message to the HSS 24 to determine if there is an S-CSCF already allocated to PUID cust1_site1@id.example_ims.net.
12. HSS 24 responds with Diameter UAA message to I-CSCF 14 with S-CSCF 16's information.
13. I-CSCF 14 proxies the Register message with credentials to S-CSCF 16.
14. Upon receiving the Register message, the S-CSCF 16 performs Diameter Multimedia-Auth-Request (MAR) message to HSS 24 to download the authentication data for PUID cust1_site1@id.example_ims.net.
15. The HSS 24 stores the S-CSCF 16 URI for PUID cust1_site1@id.example_ims.net and answers with Diameter Multimedia-Auth-Answer (MAA) message with the authentication data (authentication vectors).
16. The S-CSCF 16 validates the credentials against the authentication vector. The authentication is successful.
17. The S-CSCF 16 then sends the Diameter Server-Assignment-Request (SAR) message to the HSS to inform the PUID cust1_site1@id.example_ims.net has registered and starts to download the service profile for this user.
18. The HSS 24 responds with Diameter Server-Assignment-Answer (SAA) message, which includes the service profile for PUID cust1_site1@id.example_ims.net. The service profile includes all the Initial Filter Criteria (iFC) required for this customer. Since this is an implicit registration, the service profile includes all the Public User Identities in the implicit registration set for the aggregate endpoint (business customer 18 or wholesale customer 20).
19. The S-CSCF 16 sends a 200 OK to the I-CSCF 14 that includes all the Public User Identities registered from this implicit registration process in the P-Associated-URI header. A service-route header will be included to indicate the S-CSCF 16. An example of a P-Associated-URI header in a 200 OK message is as follows:
P-Associated-URI:
<sip:cust1_site1@id.example_ims.net>,
<sip:+19876541000@ id.example_ims.net>,
. . .
<sip:+19876542000@ id.example_ims.net>
20. The I-CSCF 14 proxies the 200 OK message to P-CSCF 16.
21. The P-CSCF 16 proxies the 200 OK message to S/BC 10. At the same time, P-CSCF 16 stores the PUID information to be used for the future call setup.
22. Now all users behind the aggregate endpoint are registered using PUID cust1_site1@id.example_ims.net.

It is to be noted that if multiple S/BCs perform the surrogate registration on behalf of an aggregate endpoint, the last registration is the one in effect.

It is to be noted that the PUID described herein makes use of the implicit registration concept. This enables the aggregate endpoint to select and provide one or more numbers as the implicit registered PUIDs to be used to call the aggregate endpoint. As defined by IMS, implicit registration is functionally equivalent to a User Endpoint or user device (UE) explicitly registering each Address of Record (AoR) in terms of access and routing support, except that the explicit registration of one AoR (public-id) triggers the implicit registration of all the other AoRs (public-ids) associated with that UE. The implicitly registered AoRs are passed back to the UE in the 200 ok of the Registration, as P-Associated-URIs. For example, assume the aggregate endpoint is a bank with a PBX connection. The PUID is used to access one or more numbers that can be used to actually reach the bank, such as 1-987-654-1000 and 1-987-654-2000 shown in the HSS data block 30 in FIG. 3, so that after the registration, all these implicit registered numbers can be reached.

Following registration of the aggregate endpoint, calls associated with that aggregate endpoint will be permitted to pass through the S/BC 10 into the network. In some cases, if a single registration cannot implicitly register all the phone numbers off the aggregate endpoints, multiple, separately provisioned independent surrogate registrations can be performed.

As a summary, key characteristics of the registration include:
1. S/BC 10 uses surrogate registration method used for individual customer to register on behalf of aggregate endpoint using a provisioned group ID as the PUID for surrogate registration purpose.
2. One or more S/BC would perform the same registration on behalf of a common set of PUIDs for the aggregate endpoint. The last that performed surrogate registration would be the one that is in effect.
3. If a single registration cannot implicitly register all the phone numbers off the aggregate endpoints, multiple, separately provisioned independent surrogate registrations can be performed.
4. As a result of surrogate registration, all the PUIDs in the implicit registration set are registered. The implicit registered PUIDs are contained in the P-Associated-URI header in the 200 OK message.
5. The Proxy Call/Session Control Function (P-CSCF) and S-CSCF that handles the registration preferably stores the PUID and the Contact information for the aggregate endpoint for future call setup verification.
6. This step preferably repeats whenever the new registration or re-registration occurs, such as S/BC 10 restarts or the registration timer expires.

Calls, Originating from an Aggregate Endpoint

Figure 4:
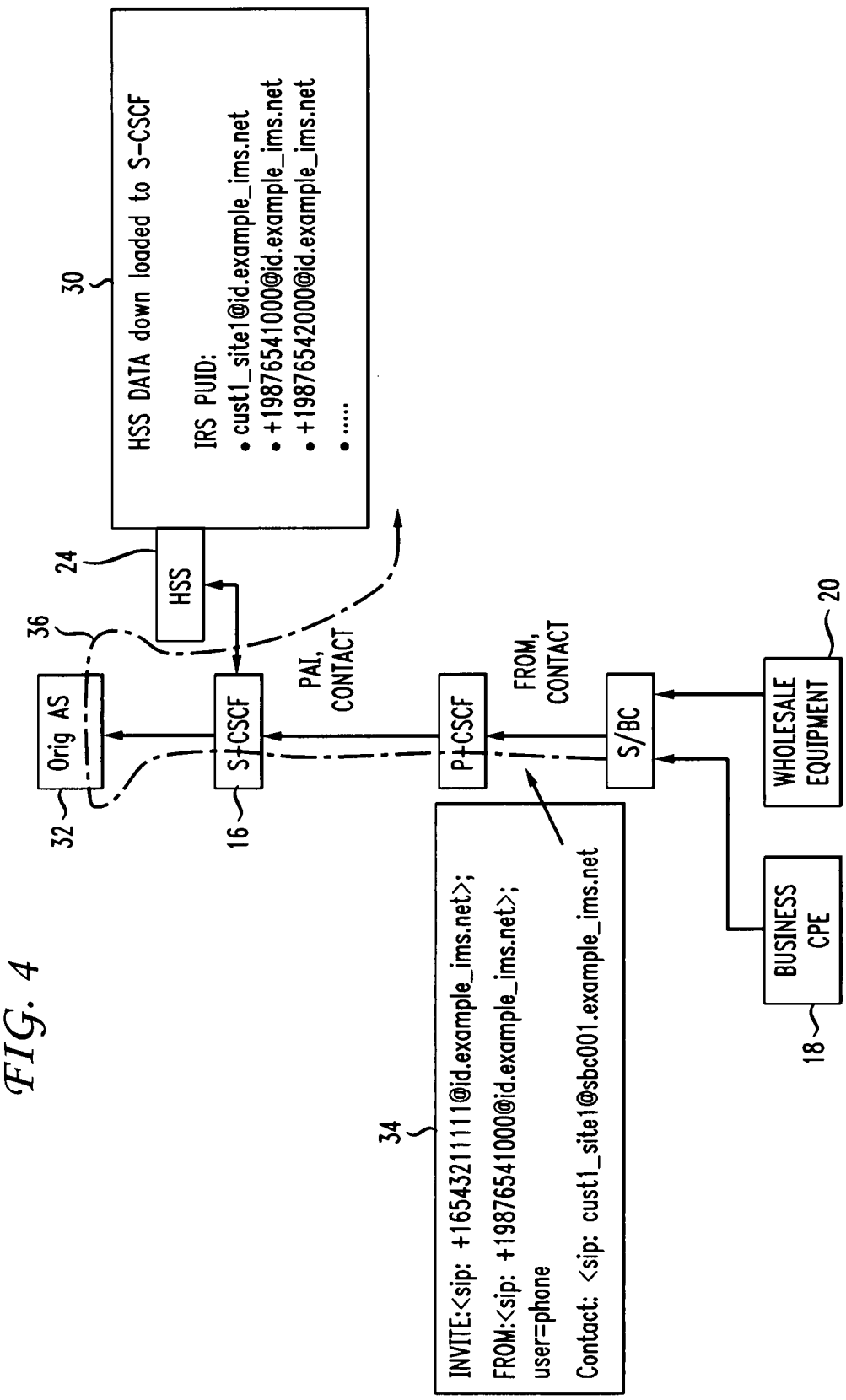
FIG. 4 is a block diagram showing propagation of an outbound call from the aggregate endpoint in the IMS network in accordance with the present invention.

When an aggregate endpoint makes a call, an outbound call will be launched from the Customer Premise Equipment (CPE) to one of the S/BCs. FIG. 4 shows an example of an outbound call flow.

After registration, the HSS 24 has already downloaded the profile of the aggregate endpoint to the S-CSCF, which enables the AS 32 to be triggered so that the specific services requested by the aggregate endpoint may be provided. The AS 32 handles particular functions, such as call forwarding, conferencing, and call waiting, which are subscribed to by the particular aggregate endpoint. The following detailed example call flow describes the preferred procedure to invoke originating AS processing:

1. S/BC 10 receives a SIP INVITE request from an aggregate endpoint (Business CPE 18 or Wholesale equipment 20). The INVITE preferably includes:
    a Calling Party Number in the From Header; and
    a Dialed number in the R-URI and To Header.
2. S/BC 10 forwards the SIP INVITE 34 to the P-CSCF 12.
3. P-CSCF 12 verifies the customer, generates P-Asserted-Identity header based on the SIP FROM header, and forwards the INVITE to the S-CSCF 16.
4. Using the PUID carried in the P-Asserted-Identity header, the S-CSCF checks the filter criteria for the request using the Service Point Triggers received in the request. From the service filter criteria (PUID/PAI/Domain/IP address is used as the trigger in this case), S-CSCF 16 determines if there are originating services that apply to this call. If there is no originating service that applies to this call, proceed to step 8.
5. If there are originating services that apply to the call, the S-CSCF forwards the request to AS 32 which has the highest priority.
6. When AS 32 receives the request, it invokes the service logic and performs service processing.
7. Depending on the service needs, the AS 32 will act as a stateful proxy, a stateless proxy, redirect server or a Back-to-Back User Agent. The AS 32 will construct SIP Request-URI based on the information the AS 32 received and the customer provisioned data in AS 32. Then the AS 32 forwards the request to the S-CSCF 16.
8. When the S-CSCF 16 receives the SIP INVITE from the AS 32, the SCSF 16 checks the list of the services that apply to this call.
    If there are other originating services that applies to this call, proceed to Step 5.
    If there is no other originating service that applies to this call, the S-CSCF 16 will route the call by using ENUM/DNS query (for SIP URI) query. If there is a positive response, the S-CSCF 16 will forward the request to I-CSCF in the terminating network. If there is a negative response, the S-CSCF 16 will forward the request to the BGCF.
    Some key characteristics for the call setup are:
    a. When an aggregate endpoint initiates a call, it can route the calls to one or more S/BCs which have performed registration on behalf of the aggregate endpoint. To achieve the goals of reliability and load sharing, multiple S/BCs are preferably used,
    b. The PUID contained in the SIP FROM header sent by the aggregate endpoint is the implicit registered PUID stated in the surrogate registration section.

Calls Terminating to the Aggregate Endpoint

Figure 5:
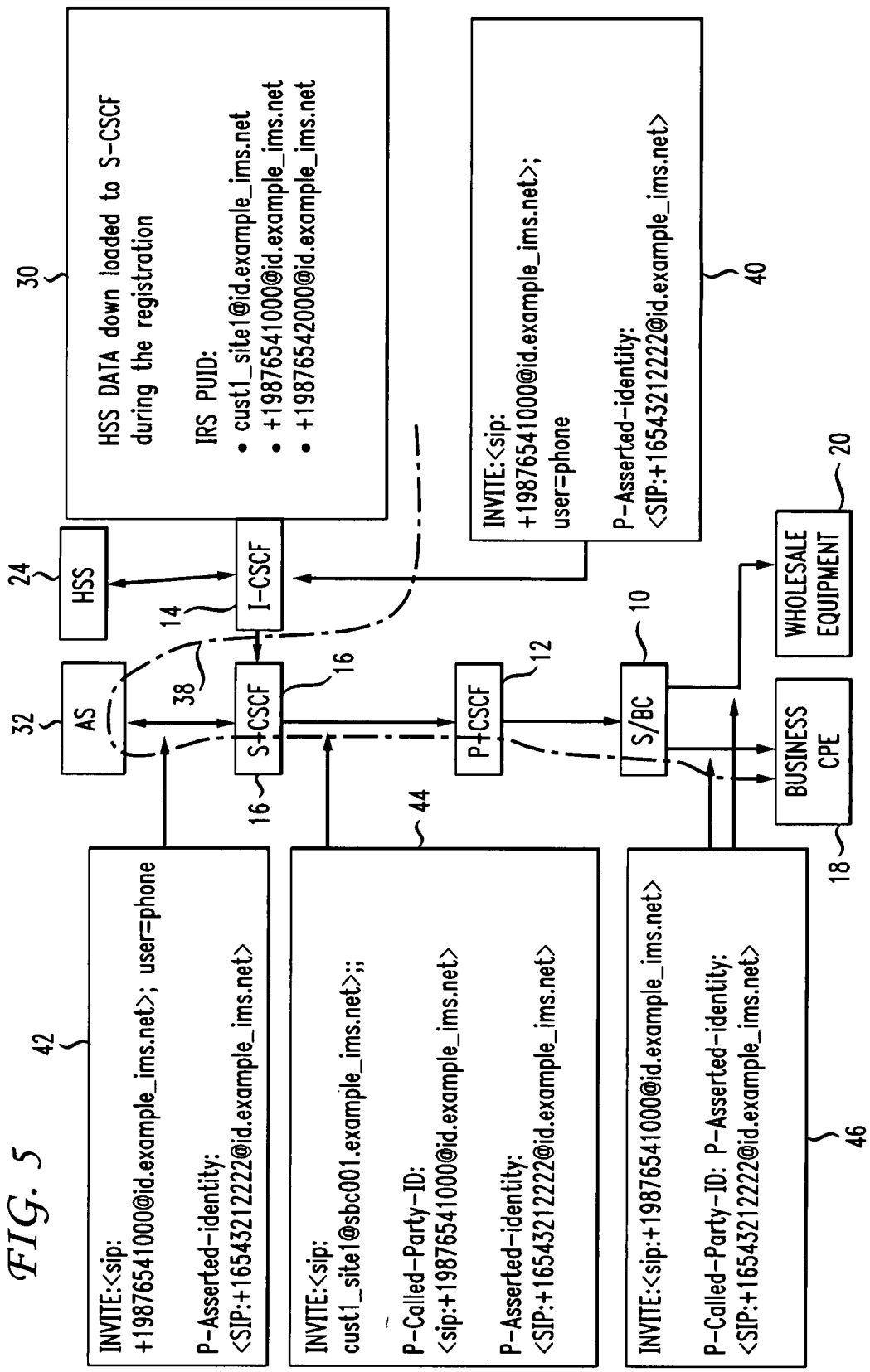
FIG. 5 is a block diagram showing propagation of an inbound call to the aggregate endpoint in the IMS network in accordance with the present invention.

Similar to the standard inbound calls to an implicit registered endpoint defined in 3GPP, for the calls terminating to an aggregate endpoint, the E.164 number is preferably used to reach the aggregate endpoint. The preferred termination call flow is shown in FIG. 5. The E.164 numbers+19876541000 and +19876542000 are used and preferably registered during the surrogate registration implicit registration process described above. The general inbound call flow is shown by arrow 38.

1. The I-CSCF 14 receives the SIP INVITE from the originating S-CSCF or MGCF. The I-CSCF 14 exchanges the Diameter Location-Info-Request (LIR)/Location-Info-Answer (LIA) with the HSS 24 to determine the S-CSCF for the called party (Request URI), one of the PUIDs from the implicit registration set. After the determination, I-CSCF 14 forwards SIP INVITE 40 to the S-CSCF 16 for the terminating party.
2. Upon receiving SIP INVITE from I-CSCF 14, the S-CSCF 16 first identifies the called party by the R-URI (a PUID in the implicit registration set) in the INVITE message. Then, the S-CSCF applies the initial filter criteria (iFC) in the user profile for the called party. If there is no service that needs to be invoked, proceed to Step 7.
3. The S-CSCF 16 determines that there is a set of services that needs to be invoked. Based on the priority defined in the iFC, the service with the highest priority will be invoked. The S-CSCF 16 forwards the SIP INVITE to the AS 32.
4. Upon receiving the SIP INVITE request, the AS 32 accesses the customer record and performs service processing.
5. Depending on the service, the AS 32 will either act as a SIP stateful proxy, redirect server, or a Back-to-Back User Agent. The AS 32 forwards the SIP INVITE request to the S-CSCF 16.
6. Upon receiving the SIP INVITE from AS 32, the S-CSCF 16 checks if additional AS processing is needed. If yes, proceed to step 3.
7. When the S-CSCF 16 finds there are no other services to be invoked, S-CSCF 16 sets the Request-URI to the contact address of S/BC 10 and proxies the INVITE with SDP to the P-CSCF 12.
8. The P-CSCF 12 queries the DNS, and based on the DNS response, it routes the INVITE to S/BC 10
9. The S/BC selects the customer site and sends an appropriate SIP INVITE with SDP to the aggregate endpoint site (Business CPE 18).

The inbound call flow preferably uses substantially the similar procedures defined in the 3GPP standard for terminating calls to an implicit registered endpoint. It is to be noted that using a Domain Name Server (DNS) query to reach S/BC in step 8 would allow inbound traffic load sharing among multiple S/BCs. This would help to achieve the reliability/load sharing goal for inbound traffic.

Thus, with limited vendor development, this invention solves the problems in conventional approaches by using existing technologies. In this way, IMS service providers can offer services to business and wholesale customers without sacrificing their service needs.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method of providing telephony services to an aggregate endpoint on an internet protocol multimedia subsystem network, the method comprising: identifying an aggregate endpoint to be registered, the aggregate endpoint being associated with a plurality of user devices, the plurality of user devices obtaining telephony services through the aggregate endpoint;

performing surrogate registration on behalf of the aggregate endpoint by one of a plurality of session border controllers coupled to the aggregate endpoint, wherein a last registration performed on behalf of the aggregate endpoint remains in effect until superseded by a subsequent surrogate registration; and storing a public user identity and a private user identity of a telephony device associated with the aggregate endpoint in one of the plurality of session border controllers, the private user identity comprising a group identification associated with the aggregate endpoint.

2. The method of providing telephony services to an aggregate endpoint on an internet protocol multimedia subsystem network defined by claim 1, further comprising performing surrogate registration by the plurality of session border controllers, each of the plurality of session border controllers being performing surrogate registration on behalf of the aggregate endpoint.

3. The method of providing telephony services to an aggregate endpoint on an internet protocol multimedia subsystem network defined by claim 1, wherein the aggregate endpoint comprises a business customer.

4. A system that provides telephony services to an aggregate endpoint on an internet protocol multimedia subsystem network, the system comprising:
    a plurality of session border controllers operatively coupled to the aggregate endpoint, the aggregate endpoint being associated with a plurality of user devices, the plurality of user devices obtaining telephony services through the aggregate endpoint;
    a call/session control function operatively coupled to one of the plurality of session border controllers; and
    a home subscriber server operatively coupled to the call/session control function, the surrogate registration being performed by one of the plurality of session border controllers on behalf of the aggregate endpoint, the surrogate registration not being performed by the plurality of user devices obtaining telephony services through the aggregate endpoint,
    wherein a last registration performed on behalf of the aggregate endpoint remains in effect until superseded by a subsequent surrogate registration, the one of the plurality of session border controllers being operative to store a public user identity and a private user identity of a telephony device associated with the aggregate endpoint, the private user identity comprising a group identification associated with the aggregate endpoint.

5. The system that provides telephony services to an aggregate endpoint on an internet protocol multimedia subsystem network defined by claim 4, wherein each of the plurality of session border controllers independently performs surrogate registration on behalf of the aggregate endpoint.

6. The system that provides telephony services to an aggregate endpoint on an internet protocol multimedia subsystem network defined by claim 4, wherein the aggregate endpoint comprises a business customer.

7. The system that provides telephony services to an aggregate endpoint on an internet protocol multimedia subsystem network defined by claim 4, wherein the public user identity comprises a group identification associated with the aggregate endpoint.

8. A non-transitory computer-readable medium comprising instructions that, when executed by a processing device, cause telephony services to be provided to an aggregate endpoint associated with a plurality of user devices obtaining telephony services through the aggregate endpoint on an internet protocol multimedia subsystem network by performing operations comprising:
    identifying an aggregate endpoint to be registered;
    performing surrogate registration on behalf of the aggregate endpoint by one of a plurality of session border controllers operatively coupled to the aggregate endpoint, wherein a last registration performed on behalf of the aggregate endpoint remains in effect until superseded by a subsequent surrogate registration; and
    storing a public user identity and a private user identity of a telephony device associated with the aggregate endpoint in one of the plurality of session border controllers, the private user identity comprising a group identification associated with the aggregate endpoint.

9. The non-transitory computer-readable medium defined by claim 8, wherein, each of the plurality of session border controllers independently performs surrogate registration on behalf of the aggregate endpoint.

10. The non-transitory computer-readable medium defined by claim 8, wherein the aggregate endpoint comprises a business customer.

11. The non-transitory computer-readable medium defined by claim 8, wherein the public user identity comprises a group identification associated with the aggregate endpoint.

12. The method of providing telephony services to an aggregate endpoint on an internet protocol multimedia subsystem network defined by claim 1, wherein the aggregate endpoint comprises a wholesale customer.

13. The system that provides telephony services to an aggregate endpoint on an internet protocol multimedia subsystem network defined by claim 4, wherein the aggregate endpoint comprises a wholesale customer.

14. The non-transitory computer-readable medium defined by claim 8, wherein the aggregate endpoint comprises a wholesale customer.

* * * * *